(12) United States Patent
Lorenz et al.

(10) Patent No.: US 9,610,757 B2
(45) Date of Patent: Apr. 4, 2017

(54) ADHESIVE BOND USING DIFFERENT ADHESIVES

(71) Applicant: Henkel AG & Co. KGaA, Duesseldorf (DE)

(72) Inventors: Jurgen Lorenz, Castrop-Rauxel (DE); Helga Garmann, Hilden (DE); Hermann Weidmann, Bopfingen (DE); Matthias Baust, Eslohe-Bremke (DE)

(73) Assignee: Henkel AG & Co. KGaA, Duesseldorf (DE)

(*) Notice: Subject to any disclaimer, the term of this patent is extended or adjusted under 35 U.S.C. 154(b) by 39 days.

(21) Appl. No.: 14/449,584

(22) Filed: Aug. 1, 2014

(65) Prior Publication Data

US 2014/0342135 A1    Nov. 20, 2014

Related U.S. Application Data

(63) Continuation of application No. PCT/EP2013/052322, filed on Feb. 6, 2013.

(30) Foreign Application Priority Data

Feb. 7, 2012 (DE) .............. 10 2012 201 780

(51) Int. Cl.

| | | |
|---|---|---|
| *B21B 21/00* | (2006.01) | |
| *B32B 37/12* | (2006.01) | |
| *B27N 7/00* | (2006.01) | |
| *C09J 5/02* | (2006.01) | |
| *C09J 5/08* | (2006.01) | |
| *B32B 21/04* | (2006.01) | |
| *B32B 37/06* | (2006.01) | |
| *C09J 175/04* | (2006.01) | |

(52) U.S. Cl.
CPC .............. *B32B 37/12* (2013.01); *B27N 7/00* (2013.01); *B32B 21/04* (2013.01); *B32B 37/06* (2013.01); *C09J 5/02* (2013.01); *C09J 5/08* (2013.01); *C09J 175/04* (2013.01); *B32B 2037/1269* (2013.01); *B32B 2037/1276* (2013.01); *B32B 2317/16* (2013.01); *C09J 2400/226* (2013.01); *C09J 2400/303* (2013.01); *C09J 2400/306* (2013.01); *C09J 2423/04* (2013.01); *C09J 2429/00* (2013.01); *C09J 2431/00* (2013.01); *C09J 2475/00* (2013.01); *Y10T 428/24851* (2015.01)

(58) Field of Classification Search
CPC ................................ B32B 21/00; B32B 21/04
USPC ......... 427/207.1, 258, 260, 265, 407.3, 408; 156/314
See application file for complete search history.

(56) References Cited

U.S. PATENT DOCUMENTS

| | | | | |
|---|---|---|---|---|
| 2,677,672 A * | 5/1954 | Luce | ....................... | C09J 131/04 524/112 |
| 4,587,141 A * | 5/1986 | Cooley | ................... | B44C 5/043 427/377 |
| 6,074,727 A * | 6/2000 | Miller | ..................... | B29C 66/71 428/198 |
| 6,179,942 B1 * | 1/2001 | Padmanabhan | ......... | B32B 21/08 156/153 |
| 6,207,289 B1 | 3/2001 | Hoffmann et al. | | |
| 6,451,444 B1 * | 9/2002 | Ollila | ..................... | B32B 21/08 428/414 |

FOREIGN PATENT DOCUMENTS

| | | |
|---|---|---|
| DE | 4311830 | 10/1994 |
| DE | 4430475 | 3/1995 |
| DE | 19728556 | 1/1998 |
| DE | 102008034828 A1 | 1/2010 |
| DE | 102009039308 A1 | 3/2011 |
| WO | 9815586 | 4/1998 |
| WO | 2009077865 | 6/2009 |

OTHER PUBLICATIONS

International Search Report issued in connection with International Patent Application No. PCT/EP2013/052322 mailed on Jun. 10, 2013.
EN ISO 2555 (Jan. 2000).

* cited by examiner

*Primary Examiner* — Scott W. Dodds
(74) *Attorney, Agent, or Firm* — James E. Piotrowski

(57) ABSTRACT

A method for adhesively bonding shaped elements made from wood-based materials to flexible film substrates, in which i) the side that is to be bonded is mechanically processed, ii) a reactive one- or two-component polyurethane adhesive is applied to the center regions of this side, iii) an aqueous adhesive based on EVA, PVAc, PVOH is applied at least to the outer region of this side, and iv) this side is bonded to a flexible substrate as an edge coating.

9 Claims, No Drawings

ADHESIVE BOND USING DIFFERENT ADHESIVES

The invention relates to a method for adhesively bonding a shaped element made from wood-based materials to a second film-like substrate, wherein a reactive PU adhesive is applied to a region of a processed surface of the shaped element, an aqueous adhesive is applied at the same time to an adjacent region, and then an adhesive bond is formed with a flexible second substrate. The invention also relates to a shaped element which is adhesively bonded to a flexible substrate along a narrow side, wherein two different adhesive layers are present.

DE 19728556 describes the use of thermoplastic compounds for filling pores in wood-based materials. The softening point should be from 140 to 240° C., wherein the compound is of medium or high crystallinity. Thermoplastic compounds are described.

DE 4311830 describes a method for covering edges of wood or particle-board panels, said edges being adhesively bonded with an adhesive. Hot-melt adhesives based on EVA, polyamide, polyester or polyisobutylene are described as adhesives. These are thermoplastic hot-melt adhesives. In addition, sealants are to be used on the edges, with examples based on polysiloxane, polyurethane or epoxy resins being described. In order to crosslink adequately, such reactive systems require a reaction time, which can conventionally be more than 24 hours.

WO 98/15586 describes the use of two-component polyurethane systems for shaping particle-board panels, fiberboard panels or plywood panels. The reactive two-component system should have a high viscosity from 150 to 350 Pas or it must demonstrate a rapid increase in thixotropy. Such polyurethane systems require a considerable reaction time for crosslinking. In addition, high-viscosity systems are more difficult to apply.

WO 2009/077865 describes radiation-curable NCO-free compositions as a hot-melt adhesive. The coating agents can also contain fillers such as silicon dioxide, for example. Coating layers for furniture, wood flooring, panels, doors and similar materials are described as areas of application. Coatings on wood, plastic, glass, veneer or textile substrates are also described. In particular, coating thicknesses of less than 200 μm are used.

DE 69413268 describes a composite adhesive and a method for bonding materials having different expansion properties to produce composite objects, such as sales counters or desks or meters, furniture, cabinets, work surfaces, profiled edges, etc. In the process a substrate material, made from wood for example, is laminated to a coating material, based on plastic for example. The substrate material and the coating material have different thermal expansion behaviors, which can have an adverse effect on the laminate. This problem is solved by the use of a composite adhesive comprising a rigid adhesive and a solvent-containing laminating adhesive. The two components are each applied to different sections of the substrate. The choice of the rigid and the laminating adhesive is not subject to any further restriction in terms of chemical composition and is determined only by the desired mechanical properties of the two components. The composite adhesive is not expandable and so does not ensure that the surface is not reproduced through the coating material. Moreover, there is no certainty that adhesive contamination on the edges of the substrate surface can be cleaned using water and in addition that a stability similar to that which can be obtained using crosslinking adhesives is achieved.

It is known that in the processing industry, wood-based materials, based for example on particle-board panels, MDF panels, wood, etc., are often permanently adhesively bonded to other substrates. Strong, weather-resistant adhesive bonds should be obtained here, while at the same time there is a requirement that the surfaces obtained should be as smooth and homogeneous as possible. It is known that defects in the supporting substrate are reproduced on the adhesively bonded substrates, for example on films. Cut edges and processed surfaces are particularly difficult to bond, as in practice the substrates have a laminar construction.

It is usual here for the inner regions of a wood-based material panel to have a lower density and thus also to be less mechanically stable. The outer layers are denser and form a more stable and mostly smooth surface. However, at the cut surfaces which have been sawn and processed, the different finishes are apparent. The surfaces are visually different, have a different pore size and pore density and may also be liable to chipping.

In order to obtain a good bond combined with a high-quality surface, it is known that liquid or hot-melt adhesive compounds can be applied to the supporting substrate. However, thermoplastic materials have the disadvantage of needing to cool, and when exposed to heat they may soften and change their bonding properties. The disadvantage of the known reactive one- or two-component systems based on polyurethanes is that they require a crosslinking reaction. Furthermore, the substrates must have a predefined, uniform moisture content, otherwise crosslinking and adhesive bonding do not take place uniformly and reproducibly.

Aqueous adhesives are likewise known. These are inexpensive, but take longer to achieve an adequate bond as the water first has to be removed from the adhesive layer. In addition, the strength of this adhesive layer is lower. Free water can also have a negative influence on the surface of wood-based materials.

The object of the present invention is therefore to provide a method for adhesively bonding shaped elements along their narrow side, wherein firstly the surface is stabilized and secondly a strong adhesive bond is ensured by means of a crosslinking adhesive. Furthermore, the applied adhesive should ensure that possible surface defects are not reproduced through the second adhesively bonded substrate. The method should allow a rational way of working, such that different drying and bonding steps are not necessary, and product deviations arising from different substrate moisture contents should be improved. Moreover, contamination at the edges of the substrate surfaces should be avoided.

The object is achieved by providing a method for adhesively bonding shaped elements made from wood-based materials to flexible film substrates, wherein at least one side is mechanically processed, a reactive one- or two-component polyurethane adhesive is applied to the center region of this side, an aqueous adhesive based on EVA, PVAc, PVOH is applied at least to the outer region of this side, and this side is adhesively bonded to a flexible substrate as an edge coating.

The invention also provides a shaped element made from wood-based materials and a flexible plastic substrate, the two substrates being connected via an adhesive layer having a first center region that comprises an adhesive layer made from a reactive polyurethane adhesive and having immediately adjacent regions that comprise an adhesive layer made from an aqueous adhesive.

The adhesively bonded element comprises two different substrates, a shaped element made from wood or wood-based materials and a flexible film-like substrate. Dimensionally stable shaped elements can be used as the first substrate. These can consist of wood, wood-based materials such as particle-board panels, plywood, MDF or OSB panels and fiberboard panels; the shaped elements can also consist of a plurality of different materials. The surface of these substrates can be mechanically processed. These processed shaped elements have a porous surface if for example they are sawn, milled, ground or otherwise shaped. Flexible substrates are used as the second substrate. These can in particular be flexible film-like substrates made from wood, paper or plastic, such as veneers, film coatings or edging strips, in particular plastic tapes or plastic films, such as HPL or CPL laminates. These can also be printed, embossed or coated, and multilayer substrates can also be used.

According to the invention the method is suitable in particular for adhesively bonding edges of panels. These are sawn, milled or otherwise shaped. A further pretreatment of this substrate surface is not necessary; it should merely be free from dust particles and free from grease. In the method according to the invention a reactive polyurethane adhesive is applied to this surface in a predefined interior region.

The adhesives for the method according to the invention can be one-component or two-component adhesives, which can crosslink via NCO groups. In order to crosslink, one-component PU adhesives react with water to form a network, while two-component PU adhesives crosslink with compounds having H-acid groups, for example OH, SH or NH groups, and additionally optionally with water. The component having the H-acid groups is the second component of the adhesive and is stored separately. Suitable adhesives can be liquid at room temperature (23° C.), for example one-component or two-component PU adhesives, and they can also be solid adhesives, such as PU-based hot-melt adhesives. These are solid at room temperature and can melt at higher temperatures, at approximately 80 to 150° C. for example. This embodiment is less preferred, however. Suitable types of PU adhesives which can be used according to the invention are known to the person skilled in the art.

In the case of two-component PU adhesive the adhesive consists of two components which are mixed together immediately before bonding. The components are a polyol component and an isocyanate component. The isocyanate component comprises reaction products known per se of polyols and an excess of polyisocyanates, monomeric polyisocyanates or mixtures of the two.

The known polyhydroxy compounds can be used for the necessary polyol component. Polyhydroxy compounds having two to ten hydroxyl groups per molecule in the molecular weight range (number-average molecular weight, Mn, as can be determined by GPC) from 100 to 10,000 g/mol, preferably in the range from 200 to 5000 g/mol, are preferably suitable as polyols.

Examples of suitable polyols are di- and/or trifunctional polypropylene glycols or polyethylene glycols, and random and/or block copolymers can also be used. Polyoxytetramethylene glycols (poly-THF) are another group of polyethers which can be used.

Furthermore, polyester polyols which can be produced by condensation of aliphatic or aromatic di- or tricarboxylic acids with 3 to 36 C atoms, e.g. adipic acid, sebacic acid, terephthalic acid, isophthalic acid, dimer fatty acid or mixtures thereof with low-molecular-weight diols or triols, such as for example ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane or mixtures thereof, are suitable as polyols. Polyesters based on ε-caprolactone, also known as polycaprolactones, are another group of polyols for use according to the invention. The molecular weight of such polyester polyols should be below 2000 g/mol.

Polyester polyols of oleochemical origin can also be used, however. These can be of natural origin or they are modified. Such polyester polyols can be produced for example by complete ring opening of epoxidized triglycerides of a fat mixture containing at least some olefinically unsaturated fatty acid with one or more alcohols having 1 to 12 C atoms, followed by partial interesterification of the triglyceride derivative to form alkyl ester polyols having 1 to 12 C atoms in the alkyl residue. They can also be castor oil.

Further suitable polyols are polycarbonate polyols, polycaprolactone diols, dimer diols or hydroxy-functional polybutadienes. Portions thereof can also be included in the polyol mixture.

Aliphatic alkylene diols can also be included. These can be linear or branched C2 to C24 diols, having terminal or lateral OH groups in the carbon chain. Higher-functional alcohols, such as for example glycerol, trimethylolpropane, pentaerythritol or sugar alcohols, are likewise suitable. Such higher-functional polyols are less preferred, however, and should be included in the polyol mixture only in small proportions.

The molecular weight of the polyols should preferably be below 5000 g/mol, in particular below 3000 g/mol. It is preferable for diols or mixtures thereof to be used. Proportions of higher-functional polyols increase the crosslink density of the adhesive. Liquid mixtures of polyols are preferably suitable for producing the OH component of two-component adhesives.

The known di- and polyisocyanates can be used as polyisocyanates. The suitable isocyanates preferably contain on average 2 to at most 5, in particular 2 to 3 NCO groups. They can be difunctional isocyanates, and oligomers can also be used. Aromatic cycloaliphatic or aliphatic isocyanates can be used. Aromatic isocyanates are generally preferred, likewise oligomerized NCO-terminal adducts of such isocyanates, as well as reaction products of low-molecular-weight polyols, polyamines or amino alcohols with the specified diisocyanates. Such isocyanates and oligomers thereof are available commercially, for example "crude MDI", pure isomers or isomer mixtures of 2,4'-/4,4'-MDI, carbodiimide-liquefied MDI or reaction products of TDI with low-molecular-weight polyols. These are stored separately from the polyol component and only mixed with the OH component immediately before bonding. The ratio of isocyanate groups to OH groups in the polyol component is in the range from 1.05:1 to 2.0:1.

For one-component PU adhesives for use according to the invention reactive PU prepolymers can be produced from the aforementioned polyols and polyisocyanates by reaction with an NCO excess. The molecular weight of the prepolymers and the NCO content can be influenced by the NCO:OH ratio. NCO:OH ratios from 1.2:1 to 2:1 are customary. The NCO content of the prepolymers can be 1.5 to 15%, relative to the prepolymer mixture. The adhesives can be flowable, or they are made flowable with plasticizers or solvents. In the absence of moisture the one-component adhesives are stable in storage and can then be used for the adhesive bonding method according to the invention.

Hot-melt adhesives are also suitable as one-component adhesives. Such hot-melt adhesives are used as an adhesive mixture that is solid at room temperature; they are then processed further in the melt. The aforementioned polyisocyanates can be used as isocyanates to produce the PU prepolymers; an NCO excess should be used in order to obtain NCO-functionalized prepolymers. Diols in particular are suitable as polyols. The choice of polyols, isocyanates and NCO:OH ratio can be used to ensure that the prepolymers have a suitable melting point, for example from 80 to 180° C.

The suitable one-component or two-component PU adhesives can contain additives and auxiliary agents known per se, such as fillers and pigments, thixotropy regulators, catalysts, adhesion promoters, resins, plasticizers and/or waxes. Such adhesives are known to the person skilled in the art, as are the methods for producing or processing such adhesives.

In particular, reactive adhesives that are flowable at low temperatures, for example at 15 to 60° C., in particular at 30° C., are suitable for the method according to the invention. These provide a good initial bond in the method, but they are still reactive, allowing a stable adhesive bond to be obtained through additional chemical crosslinking. Foaming of the adhesives should also be made easier.

For an adhesive bond according to the invention a second part of the surface is coated with an aqueous adhesive and bonded.

The known non-reactive aqueous adhesives are suitable as the aqueous adhesive; in particular these are dispersions based on ethylene vinyl acetate, polyvinyl alcohol or polyvinyl acetate. The polymers can be present on their own or in a mixture. Further additional polymers and conventional known additives can also be included. The solids content of such adhesives is mostly between 35 and 70 wt. %. The viscosity can be influenced by means of adhesives; suitable adhesives have a viscosity from 2500 to 20,000 mPas. Such adhesives are known to the person skilled in the art and are available commercially.

In the method according to the invention a first region of the processed substrate surface to be bonded is coated with the reactive PU adhesive. Methods for applying such adhesives are known. Liquid adhesives can be applied directly, hot-melt adhesives are adjusted to a suitable viscosity by melting. The viscosity is chosen such that penetration into the porous surface is possible. This can be done for example by extrusion through a nozzle, by roller application or with a blade; in particular the adhesive is applied to the surface through a nozzle. If the viscosity is too low, the adhesive will sink into the cavities and pores of the wood-based material. If the viscosity is too high, only the surface will be coated, with no anchorage achieved in the wood-based material. If liquid PU adhesives are used, it is advantageous to adjust the viscosity, via pigments, thickeners and other viscosity regulators for example, such that a good anchorage is possible in the shaped element, as described above. Suitable PU adhesives should have a viscosity from 1000 to 20,000 mPas at the application temperature (Brookfield RVT, EN ISO 2555), in particular 3000 to 15,000 mPas. In the method according to the invention the adhesive layer is chosen such that an amount of adhesive from 20 to 300 g/m$^2$ is applied. This can be 50 to 200 g/m$^2$ in particular, and a coating thickness in the material from 0.1 to 3 mm can be obtained.

In the method according to the invention the reactive PU adhesive is applied to the surface to be bonded. In particular, the adhesive is applied to the partial surface having the poorer substrate structure. With the usual construction of wood-based materials this is the region lying inside the shaped element, i.e. the inner partial surface of a cut edge is coated with the PU adhesive.

After to this process step the surface to be bonded has a further two regions adjacent to the aforementioned partial surface coated with the PU adhesive. In relation to the cut surface these surfaces are the outer edge regions. According to the invention these regions are coated with a second aqueous adhesive.

Thus in the next process step an aqueous adhesive is applied to a partial surface that is parallel to the first coated part surface. These are the aforementioned non-crosslinking adhesives. In one embodiment only the partial surface itself is coated, in another embodiment an overlapping region of the first surface coated with the PU adhesive is also coated with the aqueous adhesive, and in a further embodiment the entire surface of this side is coated. Due to the possible overlapping of the adhesive surfaces an accurate separation of the adhesive layers is not necessary; in particular it is likewise possible for an aqueous adhesive layer to be applied all over the surface to be bonded of the second film-like substrate. A further embodiment applies an aqueous adhesive to both surfaces. The amount of aqueous adhesive can be from 20 to 200 g/m$^2$, for example from 40 to 150 g/m$^2$. The total amount applied to all surfaces is taken into account here. The devices for applying an aqueous adhesive are known; the application can be carried by roller application, brushing, roll coating or in particular spray application.

Immediately afterwards the film-like substrate is pressed onto the surface coated with adhesive and pressure is applied. This process can also be supported by elevated temperatures. The water is removed from the aqueous adhesive during this process: for example the water diffuses into the substrate, or the water and the adhesive can also be distributed over the reactive PU adhesive. This ensures an adequate moisture content for crosslinking.

As the production process often occurs in line, the pressing time can be influenced by the processing speed or by the length of the section to which pressure is applied. The pressing time is from 1 to 30 seconds, in particular below 15 seconds. Thereafter the adhesive power is so strong that the composite laminate is stable for further processing.

The increased moisture content causes the PU adhesive to react with the additional water. This leads to a slight foaming of the adhesive layer. The contact pressure ensures that bubbles or foam are formed only in an amount so as to even out the cavities, holes and irregularities in the substrate. A raised process temperature can accelerate physical drying and the chemical reaction.

The first coating of the shaped elements with the first PU adhesive according to the invention achieves an improvement in processing. The sensitive substrate surfaces are strengthened, and chipping in the further processing of the surface is reduced. Adhesive bonding with two adhesives produces a fast, full-surface adhesion between the substrates. The easy foaming of the reactive adhesive layer fills and smooths possible irregularities and cavities such that a smooth and uniform surface of the shaped element is obtained. The use of the aqueous adhesive at the outer edge ensures that only a slight contamination of substrate or application devices is obtained, which can also be removed when wet. A permanent adhesive bond is ensured by the subsequent crosslinking reaction of the PU adhesive.

EXAMPLES

PU adhesive Makroplast 7221 (Henkel)
Solvent-free, contains NCO groups, viscosity approx. 9000 mPas, 25° C.
Aqueous adhesive Dorus AD 096/2:
Solids content approx. 50%, viscosity approx. 10,000 mPas, 25° C.

Method Example 1

A commercial particle-board panel is mechanically shaped along its narrow side. A one-component PU adhesive is applied to the inner surface of this side (approx. 80 g/m$^2$). Immediately thereafter an aqueous adhesive based on PVAC is applied to both substrates to be bonded (approx. 80 g/m$^2$).

Immediately thereafter the CPL laminate is adhesively bonded to the panel surface by pressing with rollers. The pressing time is approx. 5 seconds.

After 24 hours the adhesive bond is assessed.

The pores in the substrate are no longer visible.

The running of the surface is smoother and quieter than a corresponding comparison without PU adhesive.

A possible contamination of the longitudinal edge can be removed by cleaning with water.

What is claimed is:

1. A method for adhesively bonding a shaped elements made from wood-based materials to flexible film substrates, comprising:
    providing the shaped element which is to be adhesively bonded, the shaped element having a side including an outer region surrounding a center region,
    wherein the shaped element is mechanically processed,
    applying a reactive one- or two-component polyurethane adhesive to only the center region of the side,
    applying an aqueous adhesive based on ethylene vinyl acetate (EVA), polyvinyl acetate (PVAc), polyvinyl alcohol (PVOH) to at least the outer region of this side, and bonding the side adhesively to the flexible substrate as an edge coating.

2. The method according to claim 1, wherein a flowable one-component polyurethane adhesive is used as the polyurethane adhesive.

3. The method according to claim 1, wherein the polyurethane adhesive is applied in an amount from 20 to 300 g/m$^2$.

4. The method according to claim 1, wherein the aqueous adhesive is applied to the entire side of the shaped element and/or to the surface of the flexible substrate that is to be adhesively bonded.

5. The method according to claim 1, wherein the flexible substrate is heated prior to joining.

6. The method according to claim 1, wherein the wood-based material is selected from wood, particle-board panels, MDF panels and/or that the flexible substrate is selected from decorative films, plastic films, or plastic edge strips.

7. The method according to claim 1, wherein the substrates are adhesively bonded under pressure.

8. The method according to claim 1, wherein a liquid at 23° C. polyurethane adhesive is used as the polyurethane adhesive.

9. The method according to claim 1, wherein the the aqueous adhesive is applied to the outer region and the center reqion.

* * * * *

UNITED STATES PATENT AND TRADEMARK OFFICE
CERTIFICATE OF CORRECTION

PATENT NO. : 9,610,757 B2
APPLICATION NO. : 14/449584
DATED : April 4, 2017
INVENTOR(S) : Jurgen Lorenz et al.

It is certified that error appears in the above-identified patent and that said Letters Patent is hereby corrected as shown below:

In the Claims

Column 7, Line 28 Claim 1: After "to", insert -- a --.

Signed and Sealed this
Twenty-ninth Day of May, 2018

Andrei Iancu
*Director of the United States Patent and Trademark Office*